July 21, 1931. C. D. DE MERS 1,815,648
DRIER CONTROL
Filed July 24, 1930
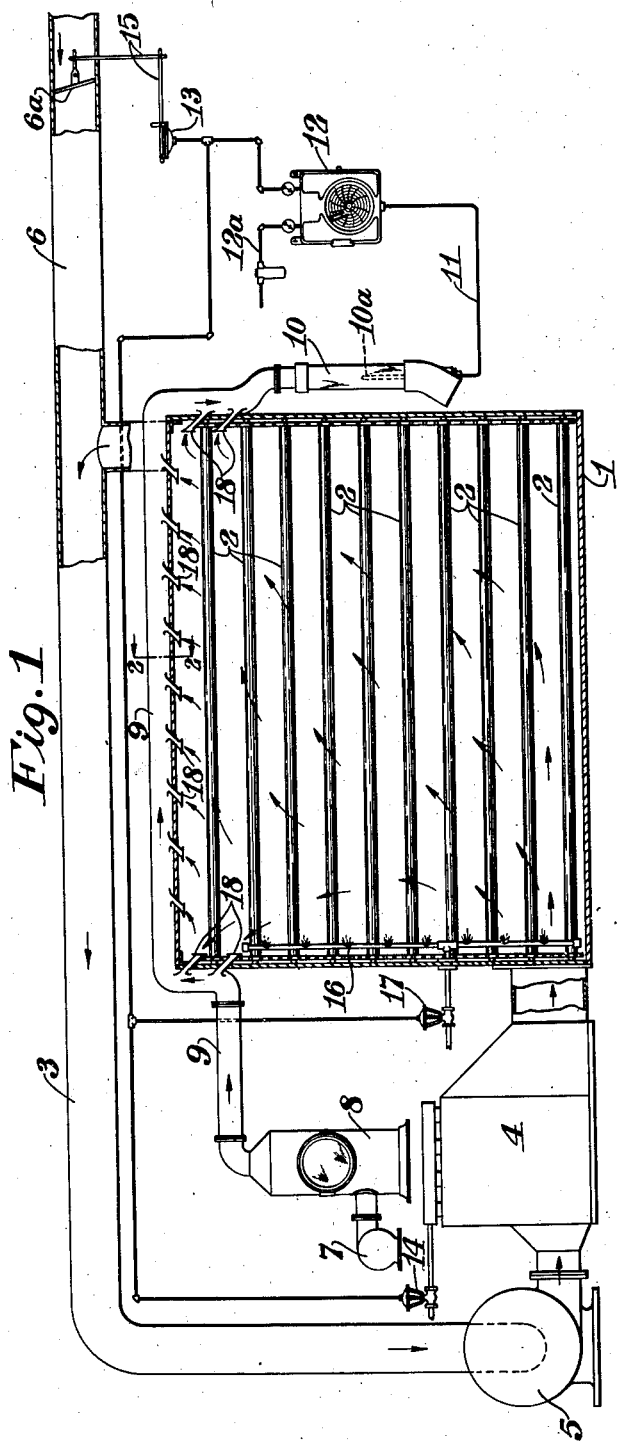
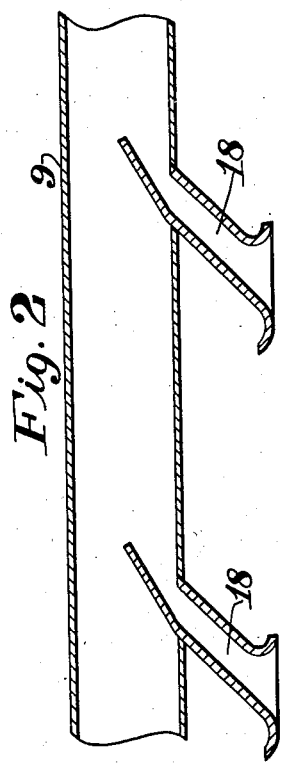
INVENTOR:
Clayton D. De Mers
BY
Alfred Burger
ATTORNEY Patented July 21, 1931

1,815,648

UNITED STATES PATENT OFFICE

CLAYTON D. DE MERS, OF ROCHESTER, NEW YORK, ASSIGNOR TO TAYLOR INSTRUMENT COMPANIES, OF ROCHESTER, NEW YORK, A CORPORATION OF NEW YORK

DRIER CONTROL

Application filed July 24, 1930. Serial No. 470,288.

This invention relates to the operation of drying materials in chambers, tunnels or the like.

In most operations of drying material, the moisture content of the drying atmosphere must be carefully controlled to produce uniformly good results.

The object of this invention is the provision of an arrangement for controlling the moisture content in a drying chamber.

For a full understanding of the invention, reference is made to the accompanying drawings wherein Fig. 1 is a partly sectional diagrammatic representation of apparatus embodying the invention; and Fig. 2 is a sectional view of a detail.

In the drawings 1 indicates a drying chamber in cross-section containing rolls 2 over which the material to be dried is moved through the chamber. The drying medium, ordinarily air, is heated in a steam-heater 4 and passed into the drying chamber near the bottom thereof, from the top of which it is again returned to the heater by a conduit 3 and a blower 5. A fresh-air intake 6, controlled by a damper 6a is connected to the circulating system, whereby fresh air may be added to the circulation medium to replace the body of the air passing out of the chamber by leakage, vents or outlets, and to dilute the moisture-laden atmosphere so as to help to maintain the relative humidity substantially constant.

The arrangement thus far described merely represents one of the many drying systems in use and does not form part of the invention. Any other arrangement or system might be chosen to show the application of the invention.

The invention comprises a special apparatus for continuously sampling the atmosphere of a drying chamber, continuously testing the samples and continuously controlling the atmosphere to maintain its relative humidity constant.

In the particular instance, a current of air which is taken from the fresh atmosphere outside the chamber, is passed by means of a blower 7 or the like through a conditioner 8, which may be of the type disclosed in the patent to Amdursky No. 1,690,155 dated Nov. 6, 1928, into and through a conduit 9 preferably but not necessarily extending along the outer wall of the chamber 1, preferably over the top or roof thereof, and thence into contact with a moisture-measuring or controlling apparatus which in the particular instance includes a so-called wet chamber 10 containing the bulb 10a, a capillary tube 11 and a controller 12 of standard type. The latter controls a flow of compressed air from a supply line 12a to a diaphragm motor 13 and to diaphragm valve 14. The diaphragm motor, through a lever system 15 controls the butterfly valve 6a in the fresh air supply line 6 while the diaphragm valve 14 controls the admission of steam to the heater 4.

In some instances the drying chamber may be provided with a discharge pipe 16 for discharging dry or superheated steam into the chamber to raise the temperature therein. This form of heating device may be used in place of the heater 4 or in addition to it. The steam flowing to the discharge pipe 16 is controlled by the diaphragm valve 17 which, in turn, is controlled like valve 14 by the controller 12.

The conduit 9 is provided with a number of orifice tubes 18 extending through the wall of the chamber into the latter so that when the stream of air flows through the conduit, the partial vacuum created causes a flow of the atmosphere in the chamber out through the tubes 18 into the stream of conditioned air with the result that the humidity of the latter is increased in proportion to the humidity conditions within the chamber.

The variations in the humidity of the stream flowing through the conduit react upon the control device 12 so as to cause the latter, upon an increase of the relative humidity within the chamber, to operate valves 14, 17 and 6a to supply more heat through the heater 4 and through pipe 16 and to admit more fresh air to the circulating system. The heat supplied to the heater must, of course, vary with the rate of supply of fresh air as it is the purpose of the heater to maintain the drying air current at the proper temperature condition. When the relative humidity in the chamber falls below the value for which the controller has been set, the damper 6a and the valves 14 and 17 are closed more to decrease the admission of fresh air and the admission of steam to the heater.

The rate of flow of the air current through the conduit 9 is fairly high, about 200-300 feet P. M. in order to produce the required suction effect and due to this fact, the variations of moisture are caused to quickly react upon the controlling instrument.

The withdrawal of representative samples of the chamber atmosphere from many points insures a fair and reliable average.

Instead of a blower 7 forcing the conditioned air through the conduit 9, any suitable suction device may be used to induce the flow of the conditioned air through the conduit. For the sake of brevity the arrangement including the conduit 9, orifice tubes 18 and the blower 7 or the like, may be designated as an aspirator.

I claim:

1. In apparatus of the character described, the combination with means responsive to moisture conditions of the air and a treater chamber, of means for maintaining a stream of conditioned air along the said chamber to the said moisture-responsive means and means for continuously admixing to the said stream representative samples of the atmosphere in the treater chamber from different and widely separated parts of the chamber.

2. In apparatus of the character described, the combination with a treater chamber, of a conduit extending along the outer wall of the chamber, a plurality of tubular connections between the interior of the treater chamber and the conduit, means at one end of the conduit for maintaining a stream of conditioned air therethrough and means at the other end for determining variations in the moisture content of the stream, the relation of the tubular connections to the conduit being such as to withdraw sample streams from the treater atmosphere.

3. In apparatus of the character described, the combination with a drier chamber, of means for continuously withdrawing representative samples of the atmosphere of the drier chamber from different and widely separated parts thereof, including an aspirator having a plurality of fluid connections with the atmosphere of the chamber, and means for maintaining a stream of conditioned air through the aspirator, and means for determining the moisture content of the fluid discharged by the aspirator.

In testimony whereof I affix my signature.

CLAYTON D. DE MERS.